United States Patent [19]

Sireul et al.

[11] Patent Number: 5,003,452
[45] Date of Patent: Mar. 26, 1991

[54] HIGH-VOLTAGE SUPPLY DEVICE FOR AN X-RAY TUBE

[75] Inventors: Jacques Sireul, Wissous; Hans Jedlitschka, Chatillon, both of France

[73] Assignee: General Electric CGR S.A., Issy les Moulineaux, France

[21] Appl. No.: 471,593

[22] Filed: Jan. 29, 1990

[30] Foreign Application Priority Data

Feb. 2, 1989 [FR] France .................. 89 01357

[51] Int. Cl.$^5$ .......................... H02M 7/10
[52] U.S. Cl. ..................... 363/61; 363/68; 363/141; 378/104
[58] Field of Search .............. 363/61, 68, 141; 378/101, 104

[56] References Cited

U.S. PATENT DOCUMENTS

| 2,925,499 | 2/1960 | Seidel .................. 378/104 |
| 3,510,748 | 5/1970 | Sakamoto et al. . |
| 3,541,424 | 11/1970 | Tada et al. . |
| 4,338,657 | 7/1982 | Lisin et al. . |
| 4,623,754 | 11/1986 | Kikuchi et al. .......... 363/68 |

FOREIGN PATENT DOCUMENTS

| 0003946 | 9/1979 | European Pat. Off. . |
| 2507616 | 9/1976 | Fed. Rep. of Germany ...... 363/61 |
| 3125240 | 3/1982 | Fed. Rep. of Germany . |
| 2239040 | 2/1975 | France . |
| 2445087 | 7/1980 | France . |
| 1233252 | 5/1986 | U.S.S.R. . |

*Primary Examiner*—William H. Beha, Jr.
*Attorney, Agent, or Firm*—Oblon, Spivak, McClelland, Maier & Neustadt

[57] ABSTRACT

In an electrical device for supplying x-ray tubes, the primary and secondary windings of the transformer are wound on circular coil forms which are adapted to fit within two half-shells. The half-shells are constituted by a recessed annular structure in which capacitors are housed. The output terminals of the secondary windings are placed on one side in order to be connected to the capacitors and to diodes over very short distances.

10 Claims, 6 Drawing Sheets

HIGH-VOLTAGE SUPPLY DEVICE FOR AN X-RAY TUBE

BACKGROUND OF THE INVENTION

1. Field of the Invention

This invention relates to electrical devices which are employed for supplying x-ray tubes.

2. Description of the Prior Art

An x-ray tube is provided with a cathode of the filament type which emits an electron beam in the direction of an anode or anticathode. The anode is formed of material such as tungsten or molybdenum which emits x-rays when it is bombarded by the electron beam from the cathode. In order to obtain a high-energy electron beam, the electrons are accelerated by an intense electric field produced between the cathode and the anode. To this end, the anode is brought to a positive potential of several tens of kilovolts with respect to the cathode. This potential may exceed one hundred kilovolts and attain one hundred and forty kilovolts.

Voltages of this order are provided by so-called high-voltage supply devices. As shown in FIG. 1 of the accompanying drawings, a device of this type includes a transformer 10 which is connected to voltage-doubling rectifier circuits 11. In more exact terms, the transformer 10 has a single primary winding 12 to which is applied an alternating-current voltage and a secondary circuit 13 which is connected to the voltage-doubling rectifier circuits 11. In the conventional manner, each voltage-doubling rectifier circuit 11 consists of a secondary winding 14, two diodes D1 and D2 and two capacitors C1 and C2 which are connected to each other in accordance with the diagram of FIG. 1. Each voltage-doubling rectifier circuit is connected to the following circuit so that their output voltages are added, thus making it possible to obtain a very high voltage in the last doubling circuit of the assembly.

In a typical example of construction, each voltage-doubling rectifier circuit has an output voltage of six kilovolts, so that the voltage is seventy-two kilovolts at the output of the twelfth voltage-doubling rectifier circuit.

It will be observed that, in order to obtain a potential difference of the order of 140 kilovolts between the cathode and the anode of an x-ray tube, it is only necessary to connect the cathode to a negative potential of 70 kilovolts with respect to ground and to connect the anode to a positive potential of 70 kilovolts with respect to ground. To this end, use is made of two supply devices which are identical with the device shown in FIG. 1.

It is apparent that the construction of a high-voltage device in accordance with the diagram of FIG. 1 gives rise to insulation problems which are often solved by separating conductors having very different potentials and by interposing between them an insulating medium such as oil which serves as coolant at the same time. This results in devices having large dimensions and substantial bulk.

One object of the present invention is therefore to construct a novel electrical and mechanical assembly of the different elements of a high-voltage supply device for x-ray tubes which is of small overall size and offers great ease of assembly.

Moreover, x-ray tubes are coming into increasingly widespread use in pulsed operation at repetition frequencies which are becoming steadily higher. In the circuit of FIG. 1, this means that the primary winding is supplied with an alternating-current voltage having a high frequency of the order of several tens of kilohertz. Under these novel operating conditions, the performances of the circuit of FIG. 1 are limited by the parasitic capacitances and inductances of the conductors and of the transformer windings, the values of which are difficult to determine and to compensate.

A further object of the present invention is therefore to construct a high-voltage supply device for x-ray tubes in which the relative positions of the different elements tend to minimize parasitic capacitances and inductances and contribute to a reduction in bulk of the assembly.

SUMMARY OF THE INVENTION

The invention relates to a high-voltage supply device for an x-ray tube, comprising a transformer which has at least one primary winding and a plurality of secondary windings, the two output terminals of each secondary winding aforesaid being connected to a voltage-doubling rectifier circuit constituted by two diodes and two filter capacitors, said voltage-doubling rectifier circuits being connected to each other so that their output voltages are added. The distinctive feature of the supply device lies in the fact that the primary and secondary windings of the transformer are wound on concentric coil forms, that the output terminals of said secondary windings are distributed on each lateral side of said concentric coil forms, that the capacitors are placed on the outer periphery of the concentric coil forms, and that the diodes are placed on one lateral side of said concentric coil forms.

In accordance with the invention, the capacitors are placed within a structure of annular shape which surrounds the concentric coil forms and serves as a support for said capacitors, concentric coil forms and diodes. This arrangement makes it possible to reduce the overall size of the entire assembly as well as the lengths of the connecting conductors between the different electrical components.

In more precise terms, the structure of annular shape is formed by two half-shells each having a first compartment for housing and supporting the concentric coil forms of the secondary windings, a second compartment for housing and supporting the capacitors and a third compartment for housing and supporting, within one half-shell, diodes and their connections to the capacitors and to the output terminals of the secondary windings and, within another half-shell, the connections from the other output terminals of the secondary windings to the capacitors.

The annular structure is provided with a slot in its outer periphery in order to place the magnetic circuit therein.

By means of mechanical elements such as tie-bolts and plates, half-shells associated with lateral covers can be maintained with respect to each other and secured to a support plate by means of feet.

DETAILED DESCRIPTION OF THE INVENTION

Figure 1:
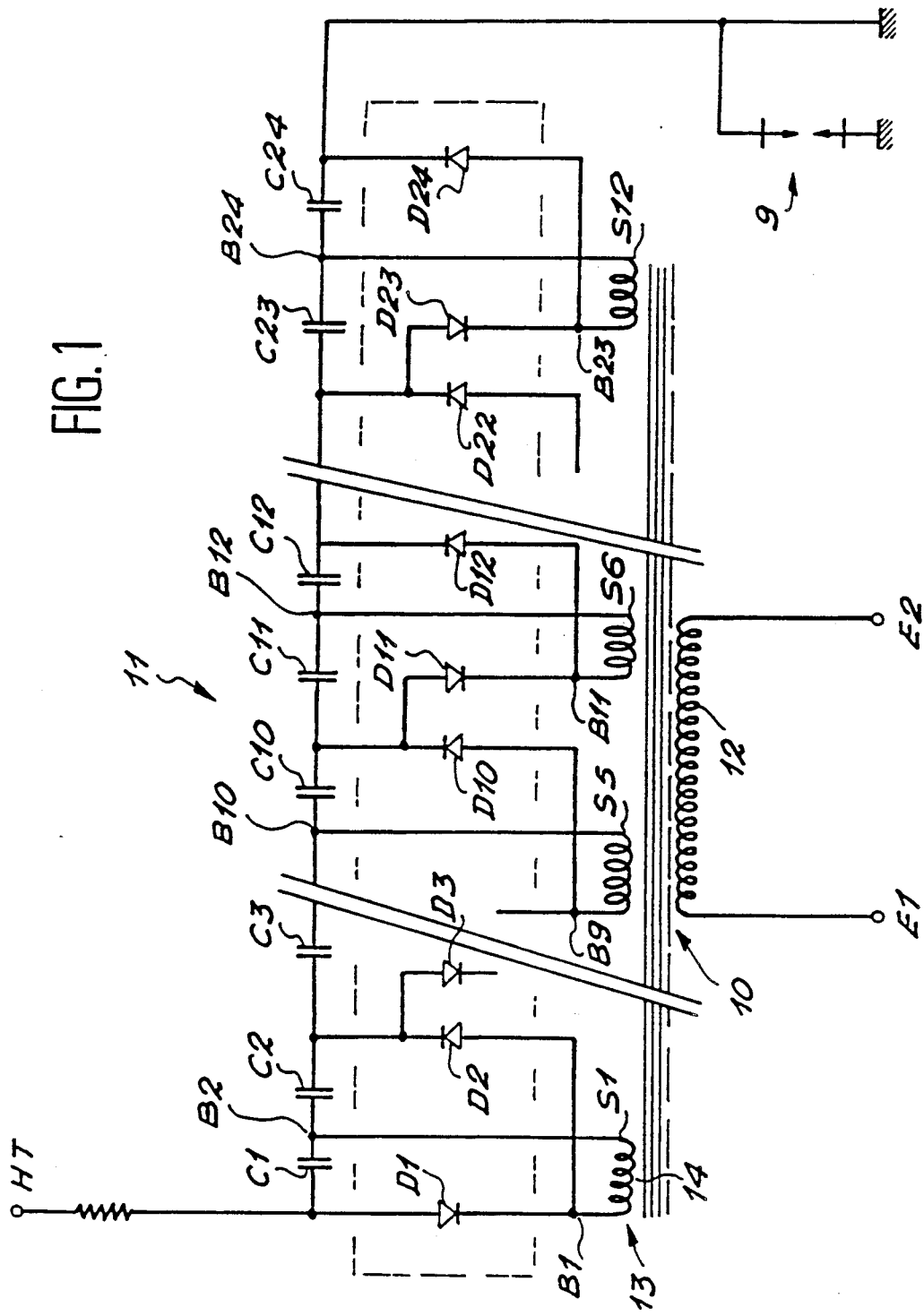
FIG. 1 is a conventional electrical diagram of a high-voltage supply device for an x-ray tube.

FIG. 1, which is the electrical diagram of a high-voltage supply device for an x-ray tube, has been partly described in the introductory part of this specification. In more precise terms, the transformer comprises a primary winding 12 and twelve secondary windings S1 to S12, the windings shown in the figure being designated by the references S1, S5, S6 and S12. Similarly, the transformer comprises twenty-four identical rectifier diodes D1 to D24, there being shown in the figure only the diodes D1, D2, D3 ... D12, D13, D14 ... D22, D23, D24.

The transformer also comprises twenty-four filter capacitors C1 to C24, there being shown in the figure only the capacitors C1, C2, C3 ... C12, C13, C14 ... C23, C24.

Each secondary winding S1 to S12 has two output terminals. The output terminals are generally designated by the references B1 to B24, the only terminals shown in the figure being those designated by the references B1, B2, B3 ... B5, B6, B7, B8 ... B23, B24.

In FIG. 1, the common node of capacitor C1 and diode D1 constitutes the terminal for the high-voltage output HT through a resistor R whilst the common node of capacitor C24 and diode D24 constitutes the ground output terminal with which a spark-gap 9 is associated.

In order to limit the lengths of the conductors which connect the output terminals B1 to B24 of the secondary windings S1 to S12, on the one hand to the diodes D1 to D24 and on the other hand to the capacitors C1 to C24, the invention makes it possible in the first place to provide secondary windings in which the similar output terminals of odd order B1, B3 ... B23 are located on a first lateral side of the windings whilst the output terminals of even order B2, B4 ... B24 are located on the other or second lateral side of the secondary windings.

The invention then provides for grouping the diodes D1 to D24 together on one and the same support which is placed on the same side as the output terminals B1, B3 ... B23 of the secondary windings. The invention also proposes to place the capacitors C1 to C24 on the outer periphery of the secondary windings and to connect said capacitors on the one hand to the diodes D1 to D24 on the first lateral side of the secondary windings and on the other hand to the output terminals B2, B4 ... B24 on the second lateral side of the secondary windings.

Figure 2:
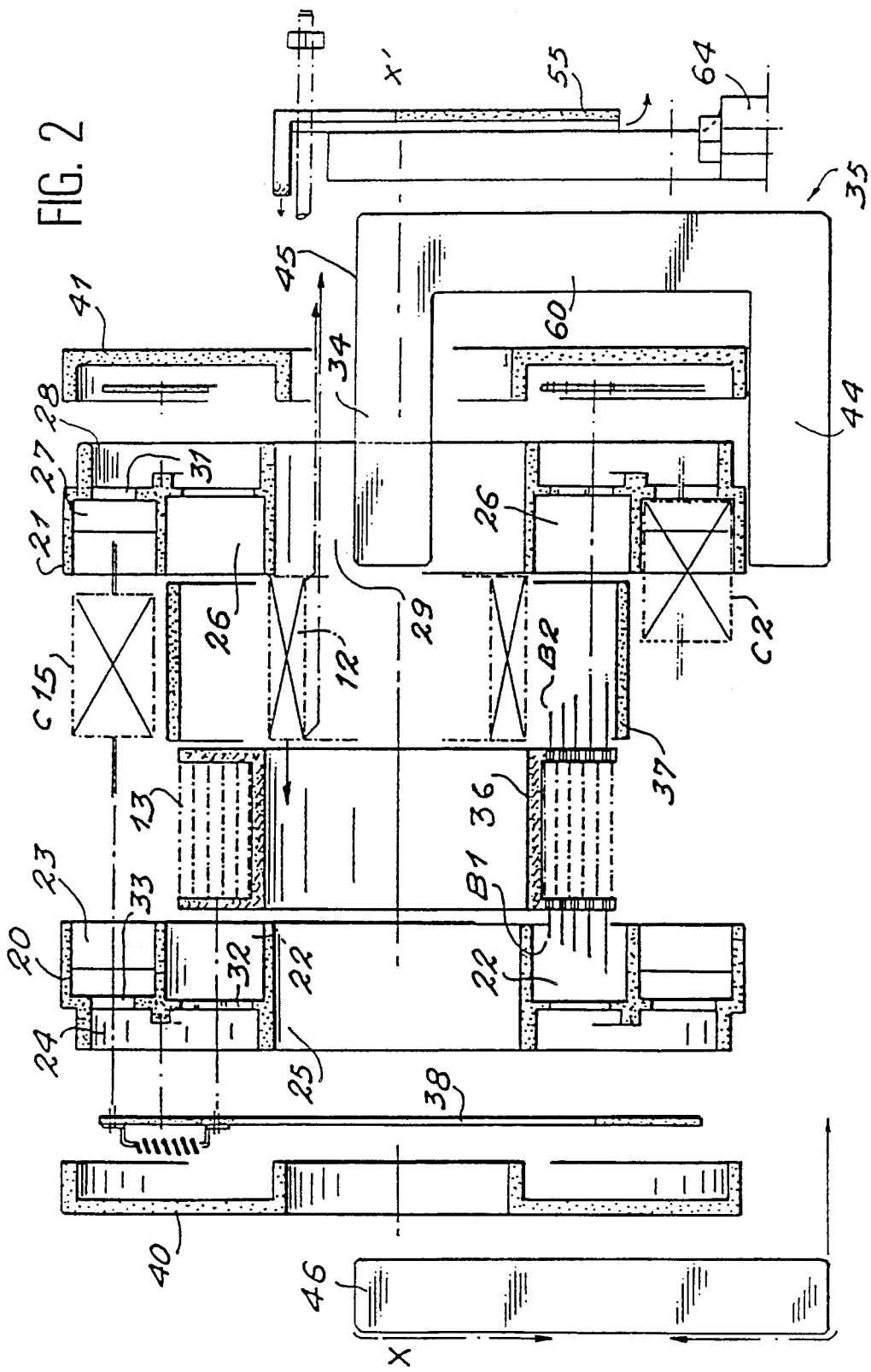
FIG. 2 is an exploded view of part of the supply device in accordance with the invention, this view being taken along a longitudinal axis x'x which passes through the axis of symmetry of the circular coil forms of the transformer windings.
Figure 3:
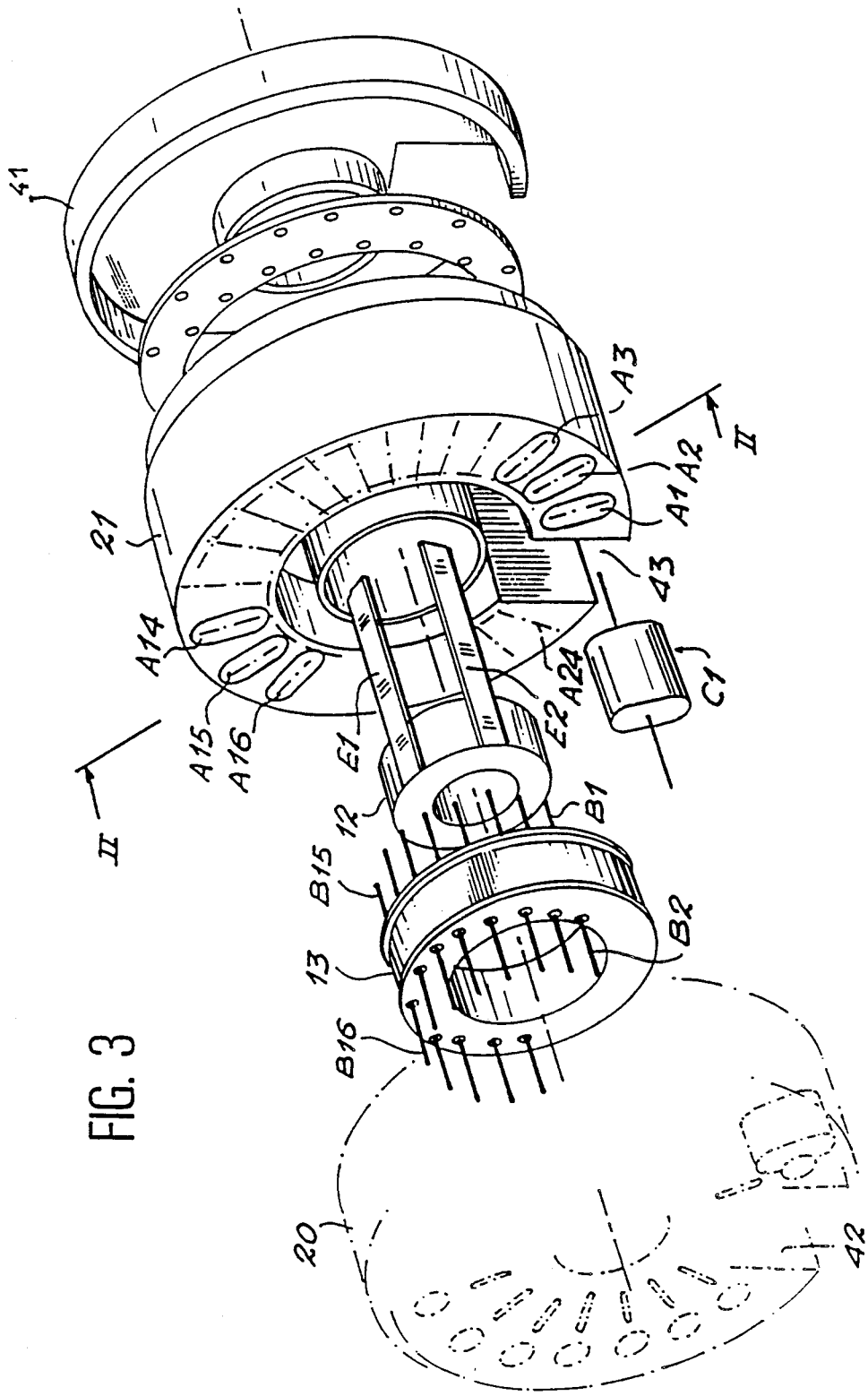
FIG. 3 is an exploded view in isometric perspective showing part of the elements constituting the supply device in accordance with the invention.

This special arrangement of the different elements in accordance with the invention will be more clearly apparent from the description of FIGS. 2 and 3. In these figures, elements which are identical with those of FIG. 1 are designated by the same references.

The device comprises two half-shells 20 and 21 in which are provided housings for placing the primary winding 12, the secondary windings S1 to S12, the capacitors C1 to C24 and the diodes D1 to D24. To this end, each half-shell 20 (or 21) has three annular compartments 22, 23 and 24 (or 26, 27, 28) around a cylindrical central portion 25 (or 29).

The first annular compartment 22 (or 26) is at the periphery of the central portion 25 (or 29) whilst the second annular compartment 23 (or 27) is at the outer periphery of the first compartment 22 (or 26). The third compartment 24 (or 29) is disposed laterally with respect to the first two compartments 22 and 23 (or 26 and 27) and is separated from these latter by partition-walls 30 and 31 respectively (or 32 and 33) which are pierced with orifices.

The central portions 25 and 29 are intended to house in particular the primary winding 12 and one leg 34 of the magnetic circuit 35 of the transformer 10. The first annular compartments 22 and 26 are intended to house the secondary windings 13 which are wound on a coil form 36 so as to make sucessive layers, the first layer corresponding to the secondary winding S1. The outer periphery of the form 36 is closed by a cover consisting of a cylindrical ring 37. The form 36 and its cover 37 are adapted to fit within the compartments 22 and 26. The second annular compartments 23 and 27 are provided with twenty-four recesses A1, A2, A3 ... A14, A15, A16 ... A24 which are intended to house respectively the twenty-four capacitors C1 to C24.

The third compartment 24 of the half-shell 20 is provided for housing the diodes D1 to D24 and for connecting them to each other, to the capcitors C1 to C24 and to predetermined output terminals of the secondary windings S1 to S12. This arrangement will be described hereafter with reference to FIG. 4.

The third compartment 28 of the half-shell 21 is provided for establishing the different connections between predetermined output terminals of the secondary windings S1 to S12 and the capacitors C1 to C24 as will be described hereafter with reference to FIG. 5.

Each annular compartment 24 or 28 is closed respectively by an annular cover 40 or 41 which is adapted to fit over the outer periphery of the associated compartment.

In order that the magnetic circuit 35 should be placed in proximity to the secondary windings, the periphery of each half-shell 20 (or 21) is interrupted so as to form a slot 42 (or 43) and the same applies to each cover 40 (or 41). One leg of said magnetic circuit is permitted to pass through said slot.

Figure 4:
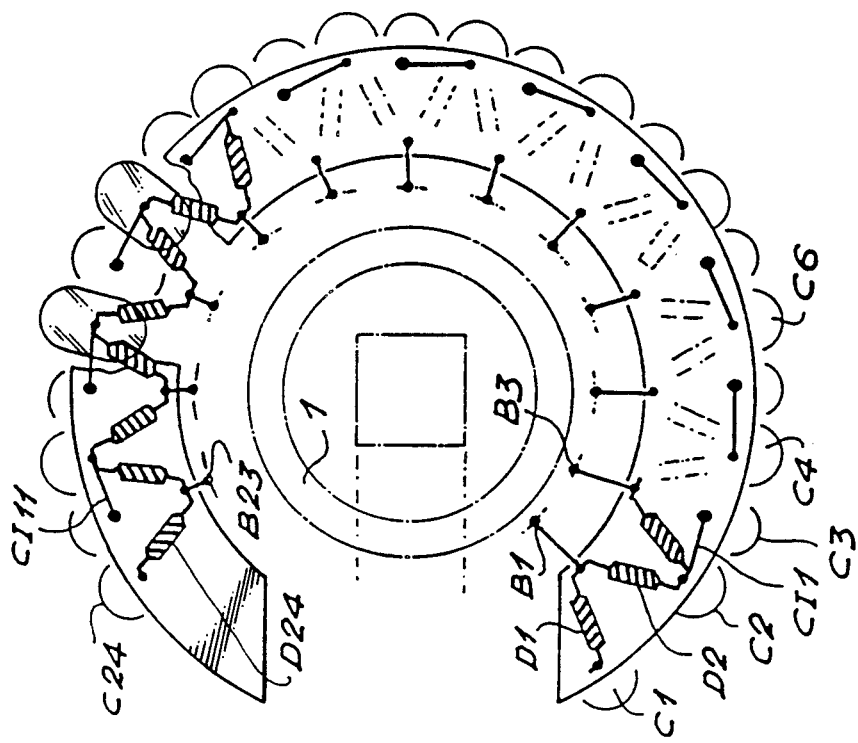
FIG. 4 is a top view of the element on which the diodes of the circuit of FIG. 1 are disposed and electrically connected.

As shown in FIG. 4, the diodes D1 to D24 are mounted on a printed circuit in the form of an annular disk sector on which said diodes are connected to each other, to one end of the capacitors C1 to C24 and to the output terminals B1, B3 ... B23 in accordance with the electrical diagram of FIG. 1. Thus, by way of example, the cathode of the diode D1 is connected to the terminal B1 of the winding S1 and the anode of said diode is connected to one end of the capacitor C1. Moreover, the terminal B1 is connected to the anode of the diode D2, the cathode of which is connected on the one hand to the anode of the diode D3 and, on the other hand, to one end of the capacitors C2 and C3, and to this latter by means of a printed conductor CI1. It will be noted that the other printed conductors CI2 to CI11 connect the other common nodes of the diodes equivalent to D2, D3 to the capacitors equivalent to C3.

Figure 5:
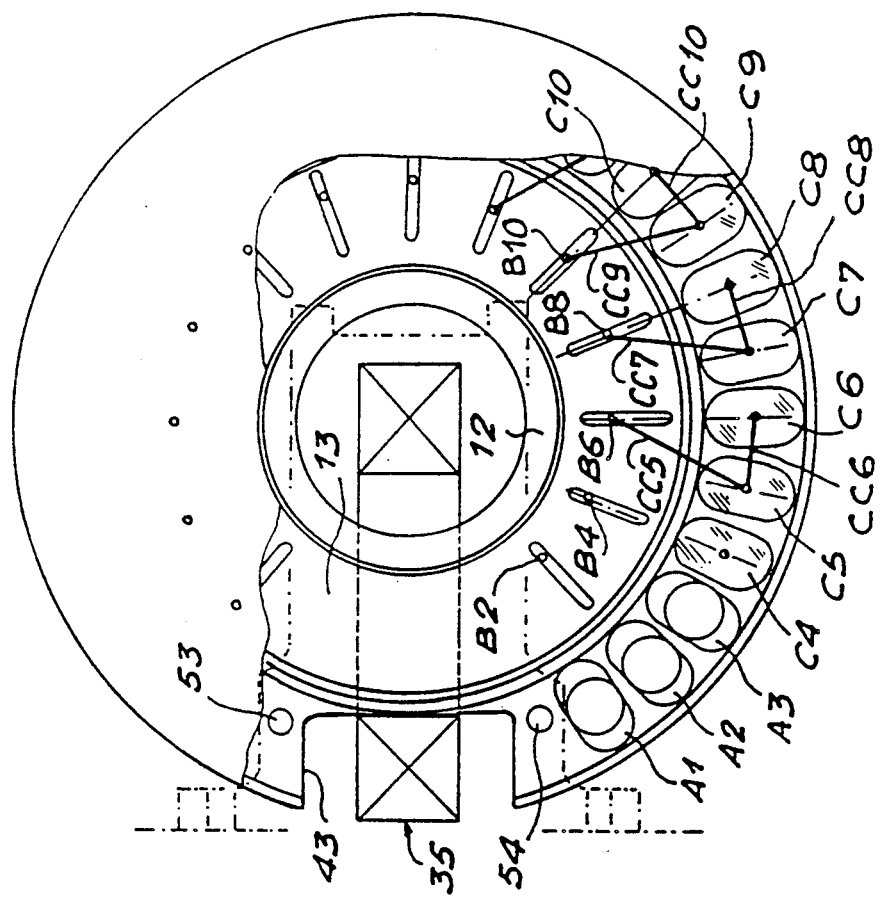
FIG. 5 is a top view with a portion broken away, showing in particular the recesses for storage of the capacitors of FIG. 1.

FIG. 5 is a top view with the cover 41 partially broken away and showing the other side of the secondary windings. In this figure, there are shown only the connecting conductors CC5 to CC10 between the terminals B6, B8 and B10 and the associated capacitors (C5, C6), (C7, C8) and (C9, C10). It will be readily understood that these conductors CC5 to CC10 can be designed in the form of leads of a printed circuit similar to the printed circuit 38 which carries the diodes or in the form of strips.

In FIG. 5, there are also shown the four legs 34, 46 44 and 60 of the magnetic circuit 35, one of which is placed within the slot 43.

The different elements which have just been described with reference to FIGS. 1 to 5 are assembled by interengagement and held in position with respect to each other by means of assembly elements so as to obtain the unit which is shown in the part-sectional view of FIG. 6. The assembly elements (not shown in FIGS. 1 to 5) consist of threaded tie-bolts and nuts and of small plates for supporting and maintaining the different legs of the magnetic circuit 35.

Accordingly, the elements of FIG. 2 are held in position by means of two threaded tie-bolts and nuts such as those designated by the references 50, 51 and 52 (FIGS. 2 and 6), the tie-bolts being housed within bores 53 and 54 (FIG. 5) which pass right through the elements of FIG. 2 along an axis parallel to the axis of symmetry x'x.

Figure 6:
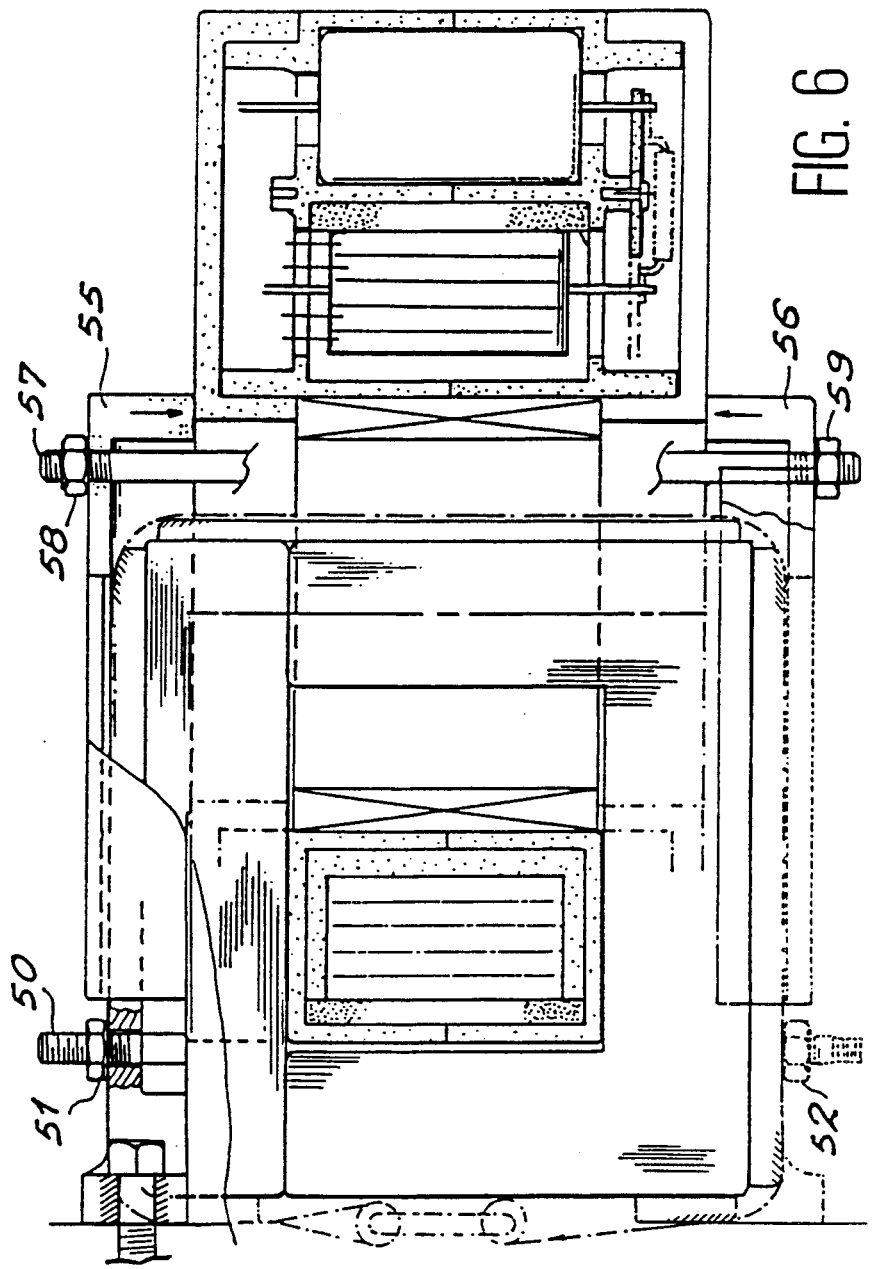
FIG. 6 is a sectional view of the complete supply device in accordance with the invention, which is taken along line x'x and passes through the magnetic circuit of the transformer.

Moreover, in order to support and maintain the magnetic circuit 35, plates 55 and 56 (as shown in FIGS. 2, 5 and 6) are provided and are maintained respectively against the covers 41 and 40 by means of threaded tie-bolts and nuts such as those designated by the references 57, 58 and 59 in FIG. 6. Said plates 55 and 56 are each intended to accommodate and maintain one leg of the magnetic circuit. Thus the plate 55 supports the leg 60 of the U-shaped portion whilst the plate 56 supports the leg 46 of the magnetic circuit which closes the opening of the U.

Figure 7:
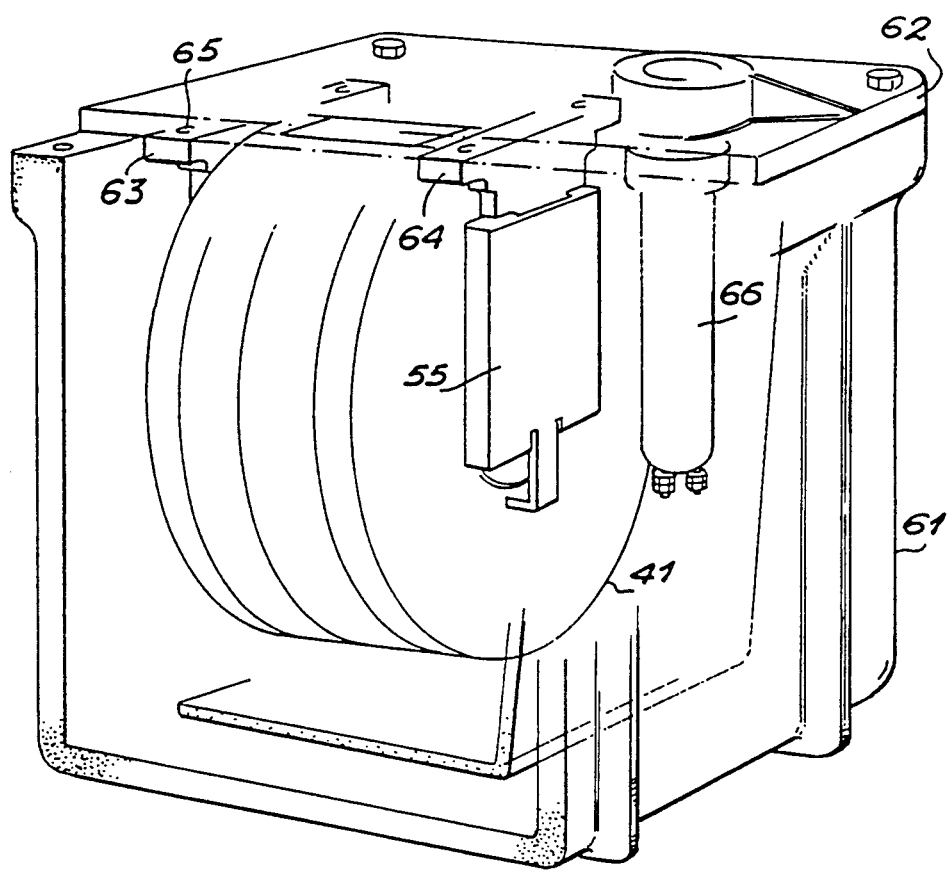
FIG. 7 is a view in perspective with a portion broken away, showing the supply device in accordance with the invention as placed within a compartment filled with insulating fuild.

The device of FIG. 6 which constitutes the high-voltage supply circuit in accordance with the invention is placed within a vessel 61 (FIG. 7) filled with insulating coolant fluid. To this end, the device is mounted on a support plate 62 which constitutes the cover of the vessel 61. Mounting on the support plate 62 is effected by means of two feet 63 and 64 which cooperate with the retaining plates 55 and 56 by fitting within recesses (not shown) formed in said plates. Said feet 55 and 56 are pierced with bores such as the bore designated by the reference 65 for passing screws (not shown) which are screwed into internally threaded bores of the cover 62.

The cover 62 also carries an insulating stud 66 which supports the high-voltage output terminal of the supply device. The other electric terminals of the supply device have not been shown in FIG. 7.

The foregoing description of the supply device in accordance with the invention shows how the objectives indicated in the introductory part of this specification have been achieved, namely small overall size, a low value of parasitic electrical elements and ease of construction and assembly.

Thus the small overall size of the device has essentially been obtained by grouping the capacitors together at the periphery of the coil form of the secondary windings. The values of the parasitic elements have been reduced to a minimum by connections of small length between the output terminals of the secondary windings and the diodes and capacitors, in particular by grouping the diodes together on a circular disk placed in proximity to the output terminals of said windings. Finally, ease of assembly has been obtained by means of elements such as half-shells, covers and coil form which are capable of interengagement and are manufactured by molding from dielectric plastic material.

The invention has been described with primary and secondary windings which are circular and concentric but it is clear that the invention can be implemented with windings that are not circular but have a cylindrical square or rectangular shape. It must be noted that the implementation of windings under the form of successive concentric layers leads to decrease the input capacity of the secondary winding as viewed from the primary winding because only the capacity between the first winding S1 and ground is taken into account the capacities of other windings being not taken into account, as being at alternative potentials. The implementation also leads to decrease the capacity between the first winding S1 and ground.

What is claimed is:

1. A high-voltage supply device for an x-ray tube, comprising a transformer which has at least one primary winding and a plurality of secondary windings, the two output terminals of each secondary winding aforesaid being connected to a voltage-doubling rectifier circuit constituted by two diodes and two filter capacitors, said voltage-doubling rectifier circuits being connected to each other so that their output voltages are added, wherein the primary and secondary windings of the transformer are wound on concentric coil forms, wherein the output terminals of said secondary windings are distributed on each lateral side of said concentric coil forms, wherein the capacitors are placed on the outer periphery of the concentric coil forms, and wherein the diodes are placed on one lateral side of said concentric coil forms.

2. A supply device according to claim 1, wherein the capacitors are placed within an insulating dielectric structure of annular cylindrical shape which surrounds the concentric coil forms of the transformer and serves as a support for said capacitors, concentric coil forms and diodes.

3. A supply device according to claim 2, wherein the structure of annular cylindrical shape is constituted by two half-shells each having a first compartment for housing and supporting the concentric coil forms of the secondary windings, a second compartment for housing and supporting the capacitors and a third compartment for housing and supporting within one half-shell the diodes and connections from said diodes to the capacitors and predetermined output terminals of the secondary windings and, within the other half-shell, the connections from the other output terminals of the secondary windings to the capacitors.

4. A supply device according to claim 3, wherein each half-shell has a slot in its outer periphery in order to house one leg of the magnetic circuit of the transformer, the other legs of said magnetic circuit being placed within the central portion of the half-shells in the case of one leg and on the lateral sides of the concentric coil forms in the case of the other two legs.

5. A supply device according to claim 3, wherein the half-shells are secured to each other by means of two annular covers which, in each case, close the outer lateral side of each half-shell and which are adapted to cooperate with clamping tie-bolts.

6. A supply device according to claim 4, wherein the legs of the magnetic circuit are maintained with respect to each other and with respect to the concentric coil forms by means of two lateral plates which are adapted to cooperate with the covers and retaining tie-bolts.

7. A supply device according to claim 6, wherein the two lateral plates are adapted to cooperate with feet which serve as supports for the entire assembly in order to fix said assembly on a plate.

8. A supply device according to claim 6, wherein the assembly is placed within a vessel filled with an insulating coolant fluid.

9. A supply device according to claim 1, wherein the concentric windings are of cylindrical, circular or rectangular shape.

10. A supply voltage according to claim 1, wherein the windings are made of concentric layers of electrical conductors.

* * * * *